United States Patent [19]

Sutehall et al.

[11] Patent Number: 5,082,380

[45] Date of Patent: * Jan. 21, 1992

[54] OPTICAL FIBRE CABLE

[75] Inventors: Ralph Sutehall, Abertillery; Andrew Summers, Newport, both of Wales

[73] Assignee: Northern Telecom Europe Limited, London, England

[*] Notice: The portion of the term of this patent subsequent to Aug. 22, 2006 has been disclaimed.

[21] Appl. No.: 544,678

[22] Filed: Jun. 27, 1990

[30] Foreign Application Priority Data

Jul. 1, 1989 [GB] United Kingdom ............... 8915177

[51] Int. Cl.⁵ .................................................. G02B 6/44
[52] U.S. Cl. ..................................... 385/114; 385/110
[58] Field of Search ............... 350/96.23, 96.20, 96.21

[56] References Cited

U.S. PATENT DOCUMENTS 4,830,459  5/1989  Chicken et al. ............... 350/96.23
4,859,025  8/1989  Houghton ..................... 350/96.23

Primary Examiner—John D. Lee
Assistant Examiner—Phan T. Heartney

[57] ABSTRACT

An optical fibre cable has a channel (2) loosely housing an optical ribbon element (3) and a non-optical ribbon element (3A) which both have an evenly distributed excess length of between 0.5% and 1% and adopt a regular undulating configuration in a thixotropic water blocking gel (28) in the channel.

10 Claims, 3 Drawing Sheets

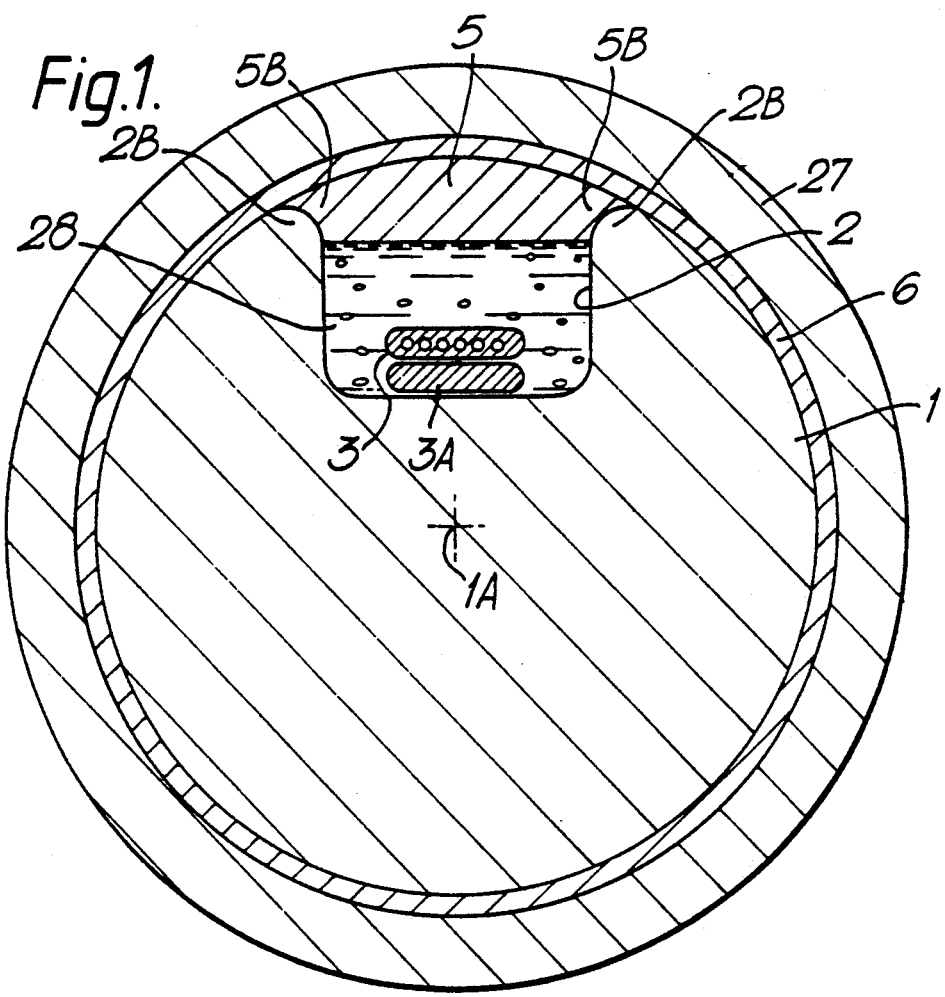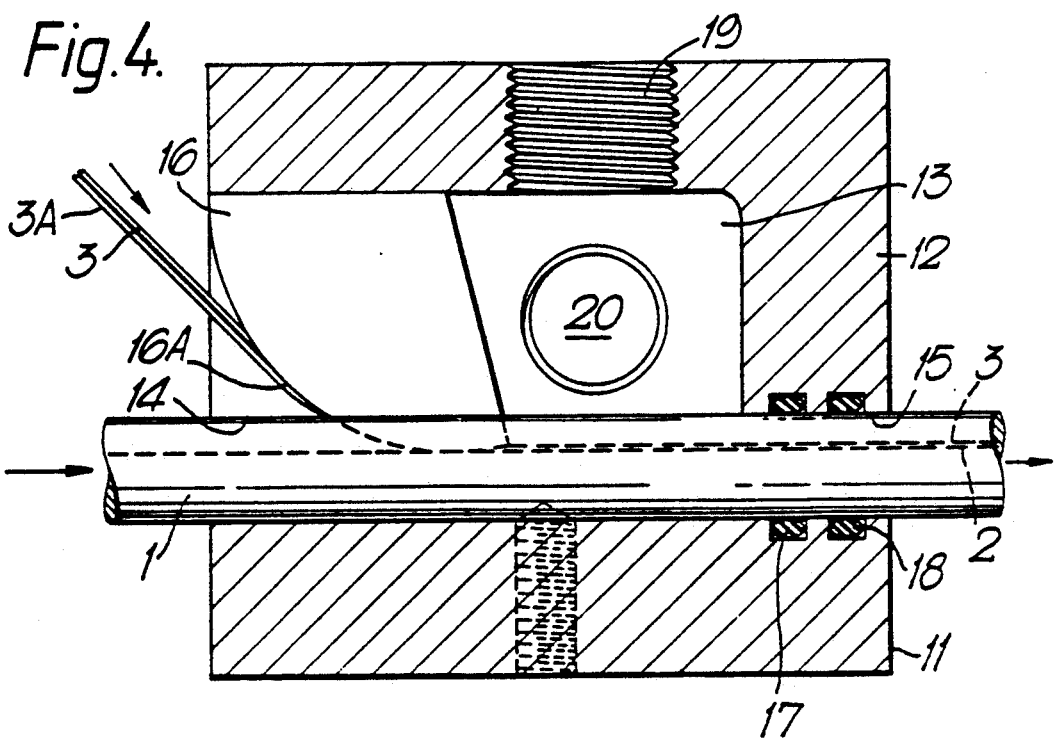

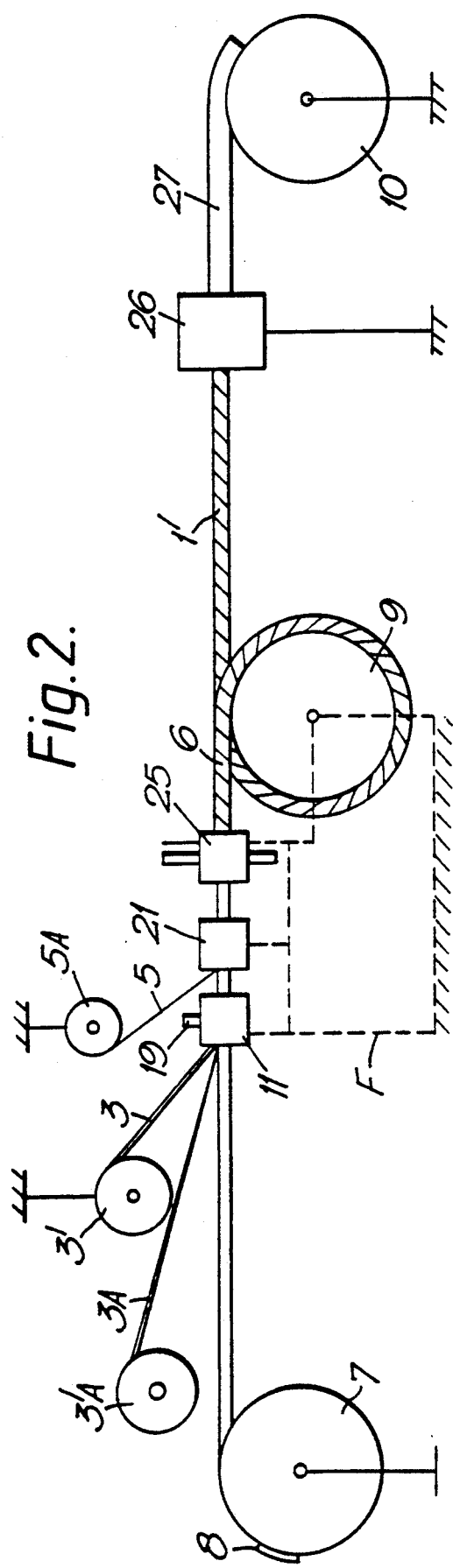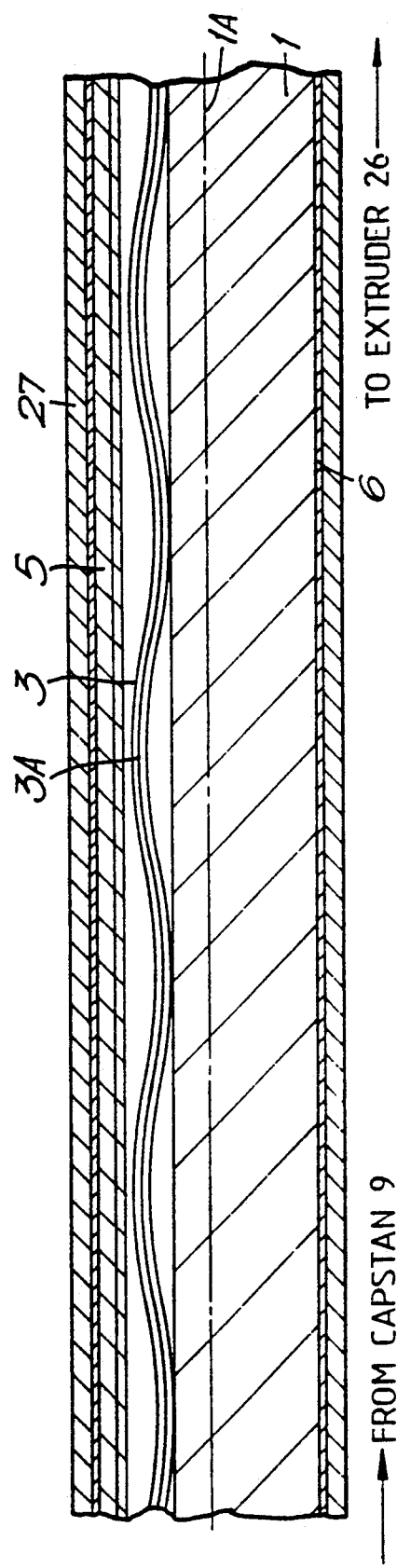

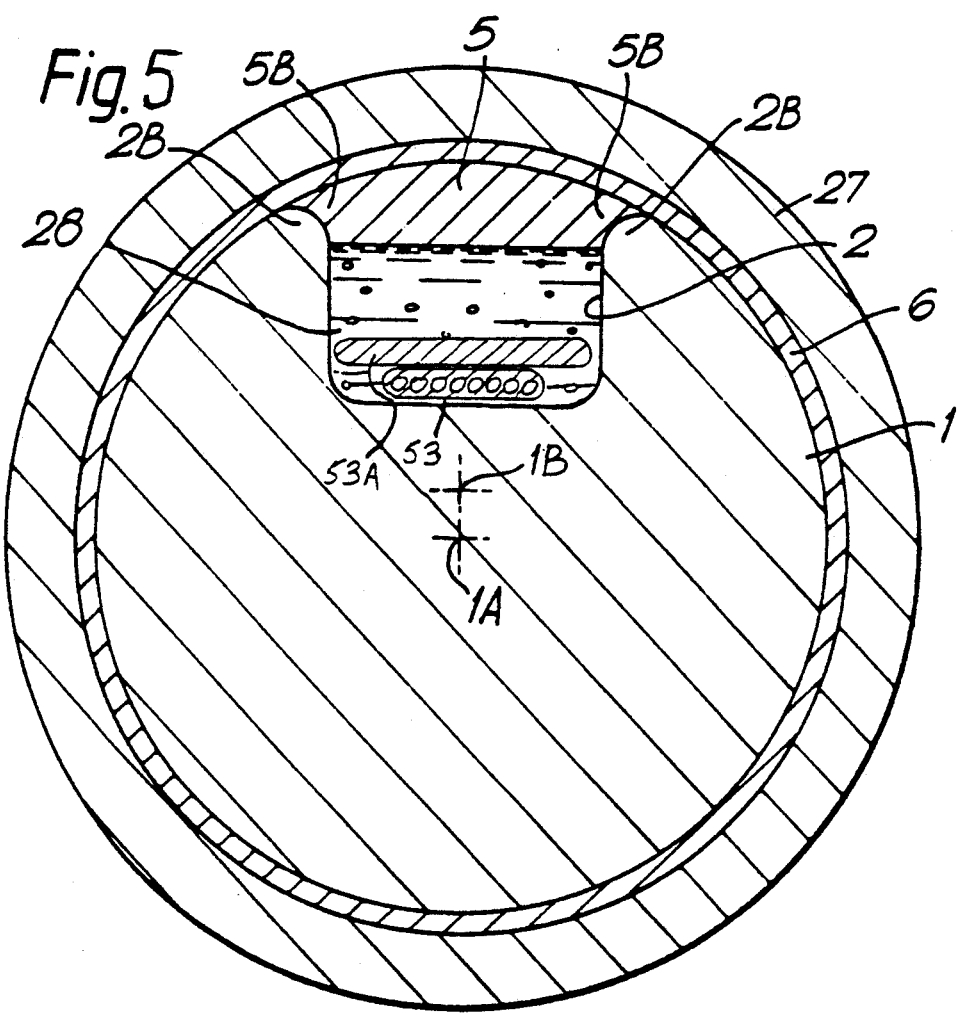

OPTICAL FIBRE CABLE

This invention relates to an optical fibre cable comprising an optical fibre ribbon element housed in a longitudinal channel of the cable, and relates particularly but not exclusively to an aerial optical fibre cable which has an all-dielectric or substantially all-dielectric construction, and suitable for installation alongside high voltage power transmission lines.

BACKGROUND OF THE INVENTION

Our published European application (0278648A2) describes an aerial optical fibre cable in which a surface-slotted dielectric core acts as the strength member and the armouring and houses a ribbon optical fibre element. The slot is filled with a soft thixotropic water blocking gel and the slot is closed and sealed with a close-fitting cap which is bound in position with a yarn. The core is then driven several times around a capstan with the cap facing outward to induce an excess length of ribbon element in the core when it leaves the capstan. Plastics material is then extruded over the core to provide a tight-fitting sheath.

This cable construction provides strain relief for the ribbon optical fibre element by ensuring that the element inside the core is longer than the cable so that when the cable is put under tension and the core stretches, the element is not put under tension.

It is an object of the present invention to provide an improved cable in which the strain relief of the optical fibre ribbon element is improved.

SUMMARY OF THE INVENTION

According to the present invention there is provided an optical fibre cable having a self-supporting ribbon optical fibre element within a longitudinal channel within the cable, and a non-optical ribbon element extending alongside the optical element, both elements adopting an undulating configuration along the length of the cable so that excess length of optical ribbon element is evenly distributed along the cable.

According to another aspect of the present invention there is provided a method of making an optical fibre cable comprising providing a cable part with a longitudinal channel therein, introducing a self-supporting optical fibre ribbon element and a non-optical ribbon element covering each other, and inducing an evenly distributed excess length of the ribbon elements within the channel, so that the elements adopt an undulating configuration along the length of the cable.

BRIEF DESCRIPTION OF THE DRAWINGS

In order that the invention can be clearly understood reference will now be made to the accompanying drawings in which:

FIG. 1 is a cross-section of an aerial optical fibre cable according to an embodiment of the invention;

FIG. 2 shows diagrammatically the manufacture of the embodiment of FIG. 1;

FIG. 3 is a longitudinal section of the cable of FIG. 1;

FIG. 4 shows part of the apparatus of FIG. 2 in more detail, and

FIG. 5 shows an embodiment similar to FIG. 1.

DESCRIPTION OF PREFERRED EMBODIMENTS

Referring to the drawing a non-electrically conductive slotted core 1 of homogenous material is made from glass-fibre-reinforced plastics by a "pultrusion" or similar process, and has a rectangular slot 2 with convexly-radiused edges 2B and containing an optical fibre ribbon element 3 lying in the slot 2. The core 1 act as the cable tensile strength member and armouring (being highly crush-resistant) and is resilient with a modulus of at least 40,000N/mm$^2$.

The slot 2 runs straight along the profile (core) 1 parallel to the central longitudinal axis 1A and is referred to as a surfacial slot. It is always located to one side of the centre of the core, the centre being referenced 1A, and to one side also of the neutral axis 1B.

In the slot is located a ribbon insert of a predetermined tensile modulus the same as or very similar to that of the optical element and which lies against the optical ribbon element. Both the optical and non-optical elements adopt the same undulating configuration as shown in FIG. 3 although they are separate elements. This undulation is in the form of a uniform waveform along the length of the cable. This undulation, when the cable is in service, i.e. suspended between pylons which may be up to 300 m apart enables the fibres of the optical element to be isolated from any strain seen by the core.

Preferably the insert non-optical ribbon is made from a cheap polymeric material which has been extruded. The width of the slot 2 is about 3 mm and both ribbon elements are about 1.5 to 2 mm wide. The optical ribbon comprises up to six optical fibres held side-by-side by a thin coating of air-dried adhesive such as disclosed in our published British Patent No. 2181271.

The slot 2 is closed by a cap 5 made of extruded plastics material and having concavely radiussed edges 5B which exactly fit onto the edges 2B.

The slot 2 is filled with a grease-like material 28, for example one sold under the brand name SYNTEC Type 270 and which is a soft thixotropic water blocking material.

Around the core 1 and the cap 5 is a binder 6 which is helically wound around and serves to locate the cap 5 in place on top of the slot 2 prior to extrusion of the outer sheath 7 and during the induction of an excess length of the elements 3 and 3A around the large capstan, to be described later.

In manufacturing the cable it is important that the finished cable has an excess length of ribbon fibre element in the slot 2. Referring now to FIG. 2, the profile 1 is run from a storage reel 7 having a brake 8 which can be applied to brake rotation of the reel 7. The core 1 passes from the reel 7 through various stages over a capstan 9 and onto a storage drum 10.

When the core 1 leaves the reel 7 it first enters a combined ribbon insertion unit and water blocking filling station 11. This is shown in greater detail in FIG. 4. Ribbon fibre element 3 is drawn from reel 3 and enters the slot 2 of the profile. The insert ribbon 3A is drawn from reel 3'A.

Referring to FIG. 4, the ribbon insertion station 11 comprises a casing 12 having a hollow interior 13 through which the profile 1 passes via an entrance port 14 and an exit port 15. There is an orientation plate 16 in the form of a guide shoe having a gently-curved surface 16A around which the optical fibre ribbon and non-optical ribbon elements 3 and 3A are guided into the bottom of the slot 2 as the core 1 is drawn through the casing 12.

At the exit port 15 there are a pair of "0" rings 17 and 18 which clean the excess of filling grease off the surface of the core.

At the top of the casing 12 is an injection port 19 through which a water blocking gel 28 such as "Syntec" is injected into the casing and is applied to the slot 2. Also in the casing is a pressure sensor 20 for sensing the pressure filling grease or gel in the casing and controlling the rate of application of the grease or gel accordingly.

When the core leaves the casing 12 with the slot 2 filled with thixotropic gel 28 it passes through a second station 21 where the cap 5 is applied.

The cap 5 is fed from a reel 5A and bent over a guide arrangement so that the mating radiussed surfaces 5B and 2B mate and fit together. The fit is a friction fit but enables the cap to nevertheless be easily removed for access to the fibres for e.g. jointing.

The core 1 then enters a binding station 25 which helically applies the binder 6 to hold the cap firmly in place. The core is then applied to the large capstan 9 which is about 1 m in diameter and because the slot containing the optical and non-optical ribbon elements is on the outside as it passes around the capstan so the length of the slot in the cable lying on the capstan is greater than the length of the core as measured at its neutral axis (very close to central axis 1A). The slot in the core when it leaves the capstan indicated in FIG. 2 by the reference numeral 1' has induced in it an excess length of the elements 3, 3A. That is to say the excess length is drawn from the supply reels 3' and 3'A and the thixotropic nature of the filling gel allows movement of the ribbon elements in order for the excess to be induced around the capstan but is sufficiently firm under conditions of no mechanical shear that it holds the ribbons in a wavy or undulating configuration along the slot when the core leaves the capstan 9.

The core and binder is then sheathed (27) in a plastics extrusion head 26 using preferably low density polyethylene, although other plastics materials can be used according to requirements. The extrusion head is shown on line in FIG. 2 but it could be off line, that is to say a separate extrusion line can be provided.

In FIG. 2 the capstan is the main driving force for pulling the core through the apparatus.

We have found that the addition of the non-optical ribbon helps ensure that the wavy or undulating configuration of the optical ribbon is regular and uniform. In particular using a suitable filling medium such as SYN-TEC 270S, it is found that the excess length of optical and non-optical ribbon can be easily and effectively induced using the capstan 9 with the filling medium already injected into the slot. We have found that it is important that the capstan is located relatively close to the fibre supply reel 3A. It is also important that the yield point of the thixotropic filling gel is low enough to enable the regular undulating configuration of the elements to be adopted within the gel 28 yet high enough to maintain the configuration in normal use of the cable.

The filling medium 28 is forced into the slot 2 in head 11 at a pressure in the range 0.1 to 0.2 p.s.i. as measured in the head 11.

FIG. 5 shows an embodiment similar to FIG. 1 and like reference numerals represent like parts. An optical element 53 and non-optical element 53A cover each other. FIG. 5 differs from FIG. 1 in that here the non-optical element 53A is located above the optical element 53, the elements are, of different sizes, and the filling water-blocking gel 28 is of different manufacture and viscosity. Optical element 53 contains eight or less optical fibres and has a width significantly less than the width of the channel 2. Non-optical element 53A is wider than the optical element, equal in fact to the width of the channel 2 so that it is a loose fit widthwise in the channel, there being a gap on each side of between 1 and 5 thousandths of an inch (25 to 125 microns). The filling gel is made by Dow under the trade name Optigard, type reference Q23314. Over a shear rate range of 200/sec carried out over a time of 55 mins, the yield value varies from 220 pascals to 450 pascals, and the apparent viscosity at yield varies from 150 pascals secs to 750 pascal secs. The apparent viscosity at 200 pascal secs drop to 10 pascal secs and the stable operating temperature of the material is $-55°$ C. to $+200°$ C. A full width optical ribbon i.e. one having the same width as the dummy ribbon would accommodate fourteen fibres in the size of cable and size of channel shown here. Two such elements would provide twenty eight fibres.

It is thus possible to offer this cable with a wide variety of fibre counts depending upon the requirements of the customer, and where a low fibre count is required, the present invention enables an excess length of optical element to be uniformally distributed along the cable core during manufacture and maintained in use of the cable. Each optical element referred to herein, be it low or high fibre count is a self-supporting element. The non-optical element is separate from the optical element and merely assists in guiding the optical element into the desired waveform uniformally along the cable. It does not form a structural part of the optical element.

We claim:

1. An optical fibre cable consisting of a non-electrically conductive core having a longitudinal channel within which a self-supporting ribbon optical fibre element is disposed, and a non-optical ribbon element of similar tensile modulus to the optical fibre element disposed in the channel and extending alongside and in abutment with the optical fibre element, both elements adopting together an undulating configuration within the channel along the length of the cable so that an excess length of optical ribbon element is evenly distributed along the cable.

2. A cable as claimed in claim 1 said channel being filled with a grease, jelly or similarly viscous water blocking liquid.

3. A cable as claimed in claim 2 wherein the core is made of high strength dielectric material forming the tensile strength member of the cable.

4. A cable as claimed in claim 1, wherein the excess length of the optical ribbon element is in the range 0.5% to 1% when the cable is straight.

5. A cable as claimed in claim 1, wherein the optical element is narrower than the channel.

6. A cable as claimed in claim 1, wherein the non-optical element lies above the optical element in the channel.

7. A method of making an optical fibre cable, comprising providing a non-electrically conductive cable cover having a longitudinal channel therein, introducing into said channel a self-supporting optical fibre ribbon element and a non-optical ribbon element having a tensile modulus similar to that of the optical element, said elements being generally in abutment, and inducing an evenly distributed excess length of the ribbon elements within the channel, so that the elements together adopt an undulating configuration within the channel along the length of the cable.

8. A method as claimed in claim 7, comprising filling the channel with a water blocking thixotropic gel or grease and then inducing the regular undulating configuration after the channel has been, filled.

9. A method as claimed in claim 7 wherein the excess length is induced by bending the cable part in a curved path so that the channel is stretched as long as the cable part is in the curved path.

10. A method as claimed in claim 8 wherein the excess length is induced by bending the cable part in a curved path so that the channel is stretched as long as the cable part is in the curved path.

* * * * *